April 24, 1945.                H. V. HARDING                2,374,348
                              CHUCK AND ELECTRODE
                              Filed Oct. 2, 1943
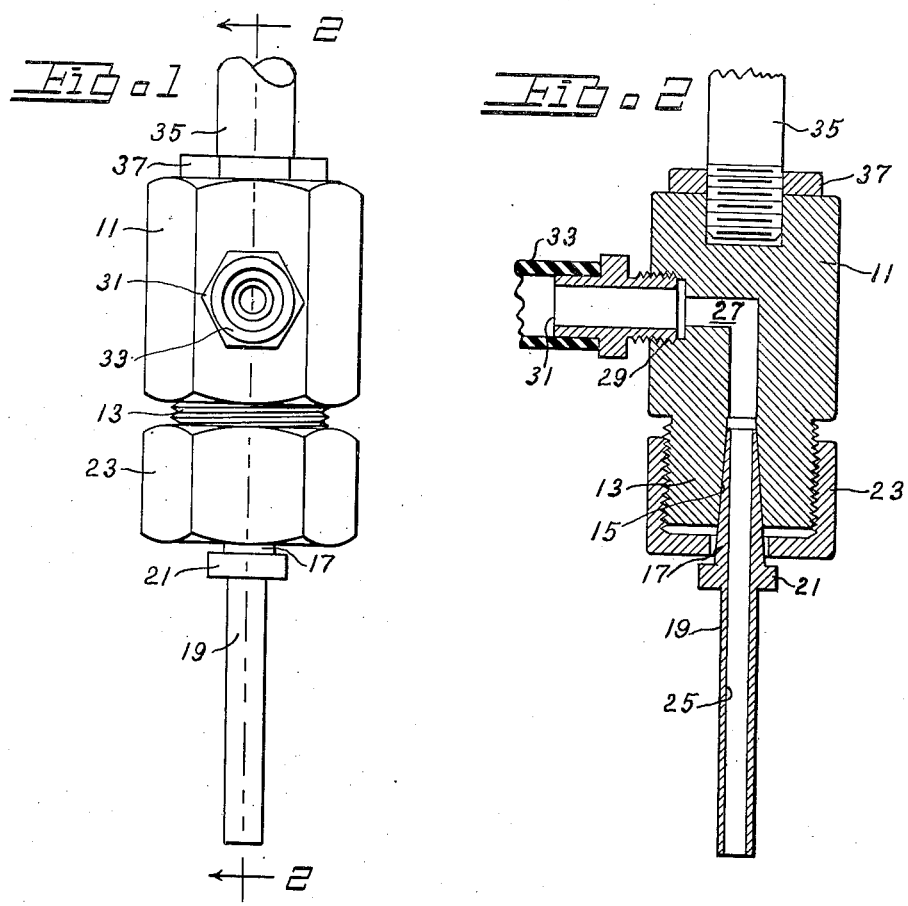
INVENTOR
HENRY V. HARDING
BY F.D.Hicks
HIS ATTORNEY Patented Apr. 24, 1945

2,374,348

UNITED STATES PATENT OFFICE 2,374,348

CHUCK AND ELECTRODE

Henry V. Harding, Royal Oak, Mich., assignor to Elox Corporation, a corporation of Michigan Application October 2, 1943, Serial No. 504,802

1 Claim. (Cl. 219—15)

My invention pertains to a quick interchangeable electrode and electrode holder for use in working on metals, as in disintegrating or removing metals, or for welding or fabricating materials, or other purposes.

It is an object of my invention to provide an improved electrode holder for snugly receiving and holding consumable metallic electrodes which may be conveniently and quickly replaced in the holder.

It is also an object of my invention to provide an improved electrode holder for conveniently receiving or releasing a consumable metallic electrode having an aperture extending therethrough and for also accurately aligning and firmly connecting a fluid flow aperture in the holder with the aperture in the electrode.

It is a further object of my invention to provide an improved metal working electrode having an aperture extending through from end to end and having on one end a head of a suitable shape to be snugly received and held in the holder and accurately centered therein and which may be conveniently ejected for replacement.

Further objects and advantages are within the scope of the invention, such as relate to the arrangement, operation and function of the related elements of the structure, to various details of construction and to combinations of parts, elements, per se, and to economies of manufacture and numerous other features as will be apparent from a consideration of the specification in conjunction with the drawing disclosing specific embodiments of the invention, in which:

Fig. 1 is a side elevational view showing my electrode and holder; and

Fig. 2 is a sectional view taken on line 2—2 thereof.

Referring more particularly to Figs. 1 and 2 of the drawing, my improved electrode holder comprises a chuck body 11 which may be outwardly conformed to be conveniently gripped by a wrench, having an extension 13 projecting from the lower side which is circular in cross section and provided with an external thread. An aperture 15 opens axially into the lower end of the extension portion of the body. Said aperture has a circular cross-section and tapers to a smaller diameter as it enters into the chuck body. For this purpose the aperture is provided with any suitable taper to firmly grip, as by wedging, a tapered shank 17 on the upper end of the electrode rod 19, which is made of any suitable metal in accordance with the metal to be worked thereby. The electrode rod is also provided with a laterally projecting shoulder 21 adjacent the tapered shank. A back-off nut 23 is adjustably inturned upon the external thread on the extended portion of the chuck body. The lower edge of the back-off nut 23 is suitably disposed and the shoulder 21 on the electrode is suitably conformed so that the electrode which has been wedged into the tapered aperture 15 may be conveniently ejected therefrom when the electrode has been consumed and must be replaced. This is readily accomplished by turning the back-off nut 23 down sufficiently to release the tapered shank 17 from the tapered aperture 15.

The taper provided within the aperture 15 in the chuck body is suitably selected in accordance with the electrodes to be supported but I have found that a Morse No. 2 taper is very satisfactory for this purpose. The taper provided on the taper shank on the upper end of the electrode rod is suitably conformed to be snugly wedged into the tapered aperture in the chuck body. The electrode is provided with a fluid conducting passage 25 extending therethrough from end to end, and wedging it into the tapered recess 15 in the chuck body serves to accurately center the electrode and at the same time connects it into snug fluid conducting relation therein to receive fluid which is conducted through passage 27 in the chuck body, and which may open through one side thereof as shown. The side opening has an enlarged internally threaded counter-bore 29 for receiving a hose fixture 31 whereon a hose 33 may be attached for connecting any suitable fluid thereinto from an available source, as will be readily understood.

The chuck body 11 may be supported on the lower end of a control bar or rod 35 whereon it may be moved or controlled, as by threadably receiving this support member 35 therein. This connection may be locked as by a lock nut 37 screwed firmly down upon the upper surface of the chuck body. The control or support rod 35 may be an operative member for adjusting, moving, vibrating, or controlling the movements of the electrode 19. One form of apparatus with which my electrode holder may be advantageously utilized is that disclosed in my co-pending patent application, Serial No. 495,382 filed July 19, 1943.

Aside from the specific embodiments of the invention herein shown and described, it will be understood that numerous details may be altered or omitted without departing from the spirit and scope of the invention as disclosed and claimed, and that I do not desire to limit the invention to the exact constructions herein set forth. The external shape of the back-off nut 23 may be round, knurled, hexagonal or any shape to facilitate turning it.

I claim:

The combination of, an electrode holder chuck body, said body having an extended portion of a circular cross-section in shape, an external thread on said extended portion of the body, a tapered aperture of circular cross-section opening axially into the extended portion of said body and diverging outwardly for receiving an electrode shank, a fluid flow conduct-passage extending in said body from said aperture for supplying fluid to an electrode wedged therein, an electrode rod having a fluid flow passage extending axially therein from one end to the other end, a shank on one end of said electrode rod tapered suitably for wedging snugly into the tapered aperture in said body for support and fluid connection, a laterally projecting shoulder on said electrode rod adjacent said shank, and a back-off nut adjustable on the thread on the extended portion of said body, said nut having an inwardly-directed annular flange disposed between the extended portion of the body and said shoulder for engaging said shoulder to eject the electrode shank from the tapered aperture.

HENRY V. HARDING.